US010389612B1

(12) United States Patent
Komendera

(10) Patent No.: US 10,389,612 B1
(45) Date of Patent: Aug. 20, 2019

(54) PRODUCT AGNOSTIC PATTERN DETECTION AND MANAGEMENT

(71) Applicant: Amazon Technologies, Inc., Seattle, WA (US)

(72) Inventor: Szymon Komendera, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 15/415,459

(22) Filed: Jan. 25, 2017

(51) Int. Cl.
*H04L 12/26* (2006.01)
*H04L 29/06* (2006.01)

(52) U.S. Cl.
CPC .......... *H04L 43/0876* (2013.01); *H04L 43/04* (2013.01); *H04L 67/42* (2013.01)

(58) Field of Classification Search
CPC .................................... H04L 43/0876
USPC ............................................ 709/224
See application file for complete search history.

(56) References Cited

U.S. PATENT DOCUMENTS

| | | | | |
|---|---|---|---|---|
| 4,819,180 A * | 4/1989 | Hedman | ............ | G01R 21/1333 307/35 |
| 7,747,243 B2 * | 6/2010 | Boatwright | ........... | H04M 3/382 455/405 |
| 8,224,630 B2 * | 7/2012 | Das | ..................... | G06F 11/0727 345/156 |
| 8,997,176 B1 * | 3/2015 | Znidarsic | ............ | H04L 63/1416 709/220 |
| 9,250,863 B1 * | 2/2016 | Vincent | ............... | G06F 9/45558 |
| 9,542,153 B1 * | 1/2017 | Suldhal | ..................... | G06F 7/00 |
| 9,582,780 B1 * | 2/2017 | Curcic | .............. | G06Q 10/0635 |
| 9,596,189 B1 * | 3/2017 | Lea | ......... | G06F 16/214 |
| 2006/0259981 A1 * | 11/2006 | Ben-Shoshan | ........ | G06F 21/126 726/27 |
| 2007/0043667 A1 * | 2/2007 | Qawami | ................. | G06F 21/10 705/50 |
| 2007/0195779 A1 * | 8/2007 | Judge | ..................... | H04L 47/10 370/392 |
| 2007/0233540 A1 * | 10/2007 | Sirota | .............. | G06Q 10/06315 705/7.25 |
| 2007/0234410 A1 * | 10/2007 | Geller | ..................... | G06F 21/31 726/8 |
| 2008/0249969 A1 * | 10/2008 | Tsui | ...................... | H02J 7/0055 706/46 |
| 2009/0113039 A1 * | 4/2009 | Savoor | .................. | H04L 63/102 709/224 |
| 2010/0110890 A1 * | 5/2010 | Rainer | .................. | H04M 15/00 370/232 |
| 2011/0137776 A1 * | 6/2011 | Goad | .................. | G06Q 20/102 705/34 |
| 2012/0215613 A1 * | 8/2012 | Madhok | ................ | G06Q 30/06 705/14.25 |

(Continued)

*Primary Examiner* — Ondrej C Vostal

(74) *Attorney, Agent, or Firm* — Knobbe, Martens, Olson & Bear, LLP

(57) ABSTRACT

Systems and methods corresponding to a network monitoring and capacity service for a set of computing devices are provided. The network monitoring and capacity planning service collects individual operation information to determine one or more usage patterns for a set of operations information. Additionally, the network monitoring and capacity service can generate information related to compliance or deviation from the determined usage patterns.

22 Claims, 11 Drawing Sheets

(56) References Cited

U.S. PATENT DOCUMENTS

| | | | | |
|---|---|---|---|---|
| 2014/0240092 A1* | 8/2014 | Nielsen | ............. | G05B 1/00 |
| | | | | 340/5.81 |
| 2015/0140955 A1* | 5/2015 | Chakraborty | ..... | H04W 52/0203 |
| | | | | 455/405 |
| 2015/0234869 A1* | 8/2015 | Chan | ............. | G06F 17/30312 |
| | | | | 707/603 |
| 2015/0310195 A1* | 10/2015 | Bailor | ............. | G06F 21/316 |
| | | | | 726/6 |
| 2016/0014002 A1* | 1/2016 | Bellis | ............. | H04L 61/1511 |
| | | | | 709/224 |
| 2016/0162308 A1* | 6/2016 | Chen | ............. | G06F 9/45558 |
| | | | | 718/1 |
| 2016/0323377 A1* | 11/2016 | Einkauf | ............. | H04L 67/1076 |
| 2016/0335110 A1* | 11/2016 | Paithane | ............. | G06F 9/45558 |
| 2017/0033984 A1* | 2/2017 | Lear | ............. | H04L 41/0803 |
| 2017/0118353 A1* | 4/2017 | Gaur | ............. | H04M 15/61 |
| 2017/0142157 A1* | 5/2017 | Cao | ............. | H04L 63/20 |

* cited by examiner

PRODUCT AGNOSTIC PATTERN DETECTION AND MANAGEMENT

BACKGROUND

In some environments, virtual machine resources from a data center can be configured for implementation of specific functionality or otherwise configured to include selected software applications. In accordance with the implementation of the specific functionality or selected functionality, the virtual machine resources can collect operations information for processing or analysis by the service provider or customer. More specifically, service providers will try to monitor operations information to determine whether errors have occurred in one or more virtual machine instances. Service providers can utilize operations information to scale the physical computing device resources of data centers such that the capacity of the data centers to meet customer requests exceeds customer requests.

BRIEF DESCRIPTION OF THE DRAWINGS

Throughout the drawings, reference numbers may be re-used to indicate correspondence between referenced elements. The drawings are provided to illustrate one or more embodiments described herein and are not intended to limit the scope of the disclosure.

DETAILED DESCRIPTION

Figure 1:
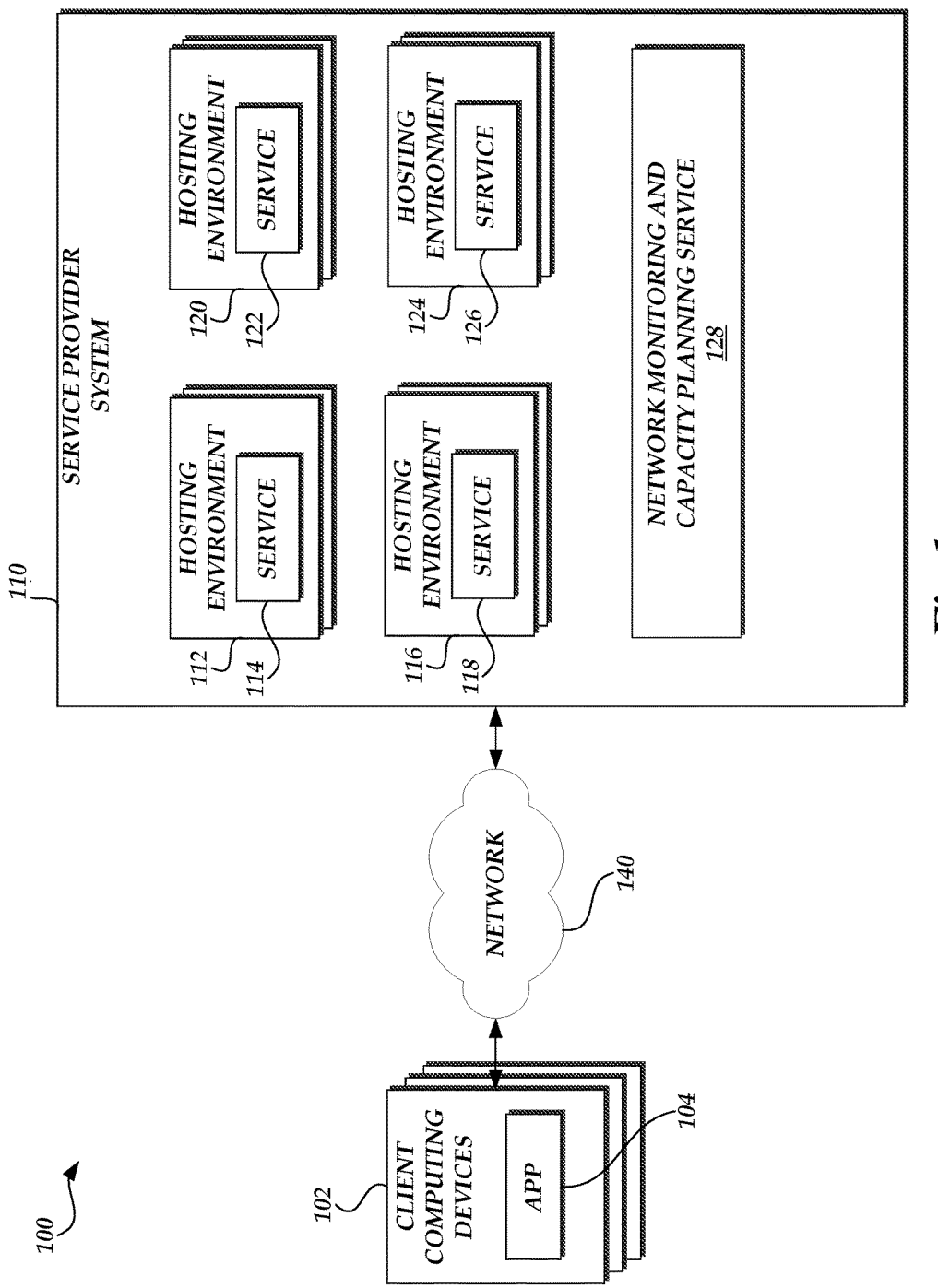
FIG. 1 is a block diagram depicting an illustrative logical network including multiple computing devices and a service provider network.

One or more embodiments of the present application correspond to management of computing devices and network services. More specifically, one embodiment of the present application relates to network monitoring and capacity planning for a network of computing devices provided by a service provider. In one embodiment, a service provider can maintain a network of computing devices that are accessible by customers of the service providers. The customers transmit requests for accessing computing device resources provided by the service provider, such as instantiation of virtual machine instances, or requests in which the service provider causes the performance of some processing or algorithms, such as a network-based service, on behalf of customers.

Service providers can attempt to maintain sufficient computing resources to meet customer demand. In one embodiment, service providers can implement network monitoring tools that review operations information related to the operation of the services and identify potential errors or inefficiencies associated with the hosting and execution of one or more virtual machine instances. In another embodiment, service providers can attempt to identify customer demand on the computing device resources it provides and allocate sufficient computing resources, such as virtual machine instances, relative to customer demand. Additionally, in one embodiment, service providers can implement corrective actions to address potential scenarios in which service provider resources experience faults or operate in a reduced capacity. By way of example, if service provider capacity experiences faults or if customer demand grows beyond available resources, customers can experience deteriorated performance, such as discarded data packets or requests that are returned incomplete or otherwise rejected.

Service provider network monitoring and capacity planning algorithms collect performance information from a set of network devices to determine how each individual device is operating and the capacity of the individual network devices to maintain current levels of service production request processing or have capacity to accept additional service production requests. In larger computing device networks, however, traditional tools focused on individual computing devices are deficient in that system administrator must manually define thresholds or other criteria that are indicative of errors or inefficiencies in the performance of at least a portion of the service provider network. Accordingly, such traditional tools are deficient in that network monitoring algorithms can only determine errors or inefficiencies as defined in a manually configured rule or set of rules. In such situations, information indicative of errors or inefficiencies in the hosting of services for clients can be overlooked if a traditional network monitoring tool is not specifically configured to monitor for such information.

As applied to the present application, in one embodiment, the service provider can implement a network monitoring and capacity planning service for a set of computing devices or a network of computing devices. In one embodiment, the network monitoring and capacity planning service collects operations information from the set of network devices or software services provided by a service provider. Such information, generally referred to as operations information, performance information, or metric information, can include, but is not limited to, file system information, networking interface information, and computing device resource information or any information related to the execution of devices or implementation of one or more software services. Accordingly, reference to operations information in various embodiments of the present application should not be construed as limiting as to any particular type of information or excluding any type of information that may be generated by or measured in accordance with the operation of virtual machine resources.

In one embodiment, individual devices can utilize software applications or agents that can transmit performance information to the network monitoring and capacity planning service. In one example, the network monitoring and capacity planning service can implement a push model in which the individual agents periodically transmit requests collected monitoring information (such as via a schedule). In another example, the network monitoring and capacity planning service can implement a pull model in which the network capacity service establishes communications with individual agents to cause the agents to transmit the performance information to the network capacity service. In one embodiment, the network monitoring and capacity planning service can specify the specific performance information transmitted by the individual computing devices, including the specification of communication templates according to the aggregation information.

As the network monitoring and capacity planning service receives the individual network device operations information, the network monitoring and capacity planning service processes the individual operations information to generate one or more usage patterns related to the performance of at least a portion of a hosted virtual machine network for an identified client. In one embodiment, the usage patterns correspond to a detection of patterns in individual operation information values or sets of operation values. The usage patterns are detected, or otherwise determined, without need for a definition or identification of the relevant operations information by a systems administrator or the like. Additionally, in some embodiments, the detected or determined usage patterns are defined relative to a monitored time period and can remain valid for a finite amount of time, which is not necessarily fixed. For example, the network monitoring and capacity planning service can determine usage patterns within a first time period and continue to utilize the determined usage patterns until the operations information of the monitored system is indicative that the usage pattern is no longer valid (e.g., a repeated batch process is repeated for a set of time and then ceases to executed). In some embodiments, some aspects of the processing of the individual operations information can also include additional processing, such as statistical processes (e.g., averaging, normalization, extrapolation, etc.). Still further, in some embodiments, the network monitoring and capacity planning service can provide the determined usage patterns to a user, such as a system administrator. For example, the user can verify that the determined usage patterns is valid, provide additional configuration information or otherwise modify the usage pattern, provide additional context information that identifies processes or services that correspond to the usage pattern (e.g., identify the batch request), and the like.

In one embodiment, the network monitoring and capacity planning service can continue to receive operations information from one or more hosted virtual machine instances. The network monitoring and capacity planning service can process individual operations information based on the usage patterns. In one embodiment, the network monitoring and capacity planning service can identify operations information that is characterized as in compliance with the usage pattern or within a defined tolerance range. In another embodiment, the network monitoring and capacity planning service can identify operations information that is characterized as deviating or non-compliant with the usage pattern, such as by one or more statistical deviations. In still further embodiments, the network monitoring and capacity planning service can identify a lack of operations information according to the usage pattern, such as a lack of expected activity. The resulting usage pattern information can be provided to one or more users.

In still further aspects of an embodiment of the present application, the network monitoring and capacity planning service can also utilize additional information to generate causal information for any determined deviations from the usage patterns. In one embodiment, the network monitoring and capacity planning service can obtain information from one or more virtual machine instances related to the implementation of at least a portion of a hosted virtual network. The network monitoring and capacity planning service can then implement machine learning algorithms that attempt to associate various inputs to the determined deviation of the usage patterns. For example, the network monitoring and capacity planning service can identify one or more processes that are being executed at a time a deviation from a usage pattern is identified. In another embodiment, the network monitoring and capacity planning service can identify resource consumption information, such as network utilization, that occurs at the time a deviation from a usage pattern is identified. The network monitoring and capacity planning service can utilize past error analysis as part of the machine learning algorithm.

Although aspects of some embodiments described in the disclosure will focus, for the purpose of illustration, on the illustrative interactions for requesting content and processing of operations information by a network monitoring and capacity planning service, one skilled in the relevant art will appreciate that the examples are illustrative only and are not intended to be limiting. Reference to a network monitoring and capacity planning service does not require implementation of any specific monitoring process, capacity planning process or the implementation of both network monitoring processes and capacity planning processes. Accordingly, one or more aspects of the present application may be applicable with regard to various network monitoring processes or capacity planning processes. Likewise, reference to specific operations information for purposes of illustrative examples should not be construed as being required for all network monitoring and capacity planning services.

FIG. 1 is a block diagram depicting an illustrative logical network 100 including multiple computing devices 102 and a service provider network 110 in communication via a network 140. While the computing devices 102 are shown as a group within FIG. 1, the computing devices 102 may be geographically distant, and independently owned or operated. For example, the computing devices 102 could represent a multitude of users in various global, continental, or regional locations accessing the service provider system 110. Accordingly, the groupings of computing devices 102 within FIG. 1 is intended to represent a logical, rather than physical, grouping. Similarly, while one set of illustrative components is shown to represent the service provider system 110, multiple instances of each component may be present within the content management system 110, and such components may be located within geographically diverse areas (e.g., globally, continentally, or regionally), in order to provide a wide geographical presence for the content management system 110. As will be described in greater detail below, some computing devices 102 can include a software application 104, such as a browser application or other application, for communicating with various components the service provider system 110.

Computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Computing device 102 may include one or more data stores (not shown in FIG. 1) including various applications or computer-executable instruction, used to implement the embodiments disclosed herein.

Network 140 may be any wired network, wireless network, or combination thereof. In addition, the network 140 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the computing devices 102 and the service provider system 110 is depicted as having a single connection to the network 140, individual components of the computing devices 102 and service provider system 110 may be connected to the network 140 at disparate points.

In accordance with one or more embodiments, the service provider system 110 includes a set of hosting environments, illustrated in FIG. 1 as hosting environment 112, 116, 120, and 124. As described in further detail below, the hosting environments 112, 116, 120, and 124 can host one or more services 114, 118, 122, and 126. As will be discussed below, for purposes of illustration, some of the hosted services, such as services 114, 118, 122, and 126 may correspond to geographic regions (e.g., data centers). Accordingly, although FIG. 1 illustrates a single service provider system 110, it can represent a collection of large numbers of computing devices operable for hosting services. The service provider system 110 can also include a network monitoring and capacity planning service 128 that can determine usage patterns and facilitate in capacity planning and error mitigation, which will be described in greater detail below.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and service 114 may be executed by one more virtual machines implemented in a hosted computing environment. Additionally, the network monitoring and capacity planning service 128 may correspond to multiple physical or virtual computing resources that may logically represented as a single component, but may be implement in a distributed manner.

Figure 2:
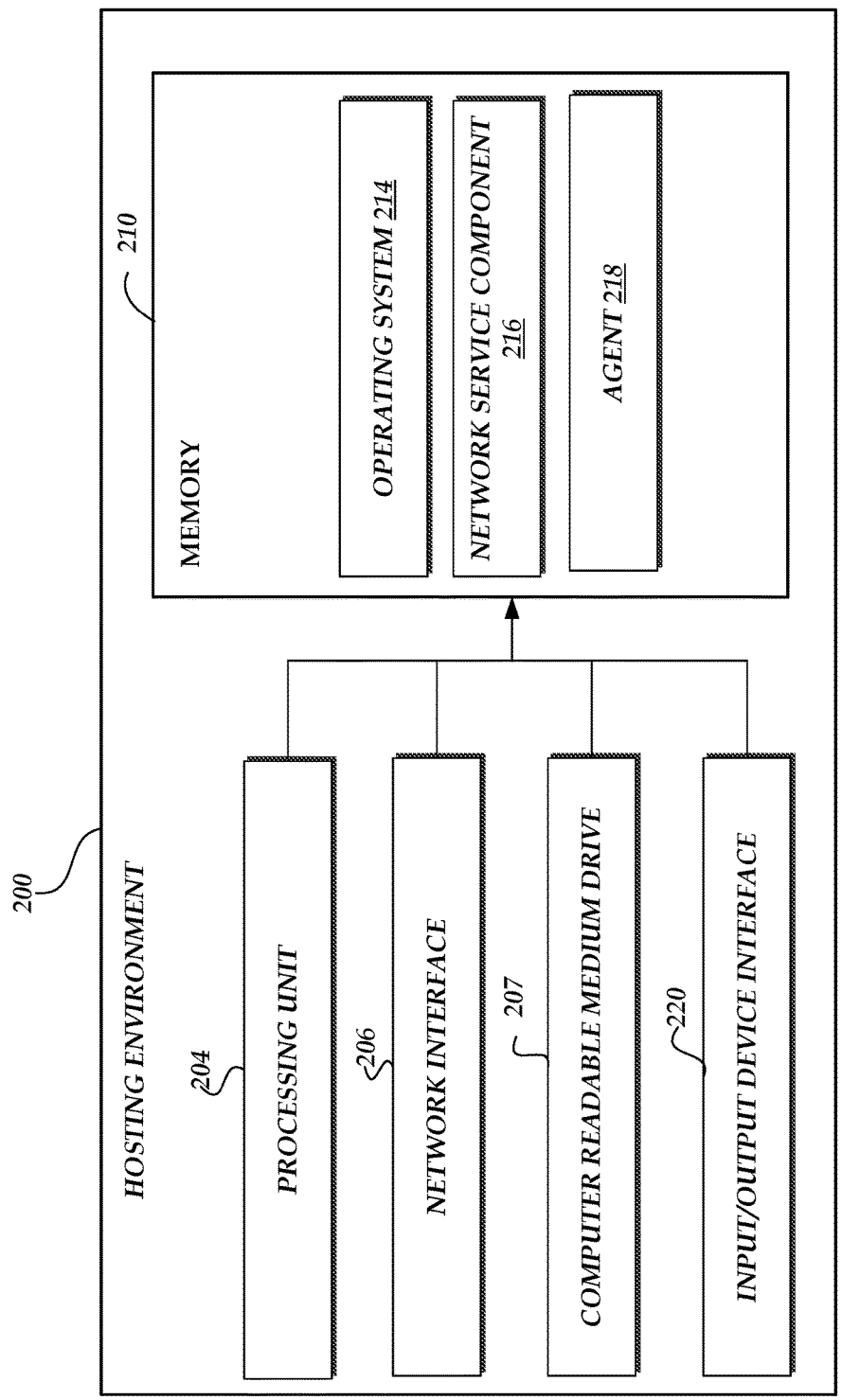
FIG. 2 is a block diagram of illustrative components of a hosting environment for hosting applications in accordance with one or more embodiments of the present application.

FIG. 2 depicts one embodiment of an architecture of an illustrative hosting environment 200, such as hosting environments 112, 116, 120, and 124 that host virtualized applications, services or processing, generally "services", such as services 114, 118, 122, and 126 in accordance with the present application. The general architecture of the hosting environment depicted in FIG. 2 includes an arrangement of computer hardware and software components that may be used to implement aspects of the present disclosure. As illustrated, the hosting environment includes a processing unit 204, a network interface 206, a computer-readable medium drive 207, an input/output device interface 220, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the functionality implemented by the host computing device. The memory 210 may further include computer program instructions and other information for implementing aspects of the present disclosure. For example, in one embodiment, the memory 210 includes a host network service component 216 that corresponds to functionality provided by the instantiation of the host computing device illustrated in FIG. 1 as virtual desktop services 114, 118, 122, and 126. As illustrated in FIG. 2, the host environment 200 includes a network service component 216 that generally represents the services provided by the host environment 200. Additionally, the host environment 200 can include a software application for receiving configuration to collect and transmit operations information, generally referred to as an agent 218. Illustratively, the operations information or performance information can include, but is not necessarily limited to, file system information, network interface information, and resource consumption information. For example, the agent 218 can collect information related to CPU utilization during a defined time window or a specified time intervals. In another example, the agent 218 can collect operations information related to measure packet loss rates, network packet retransmission rates, etc. In still other example, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

Figure 3:
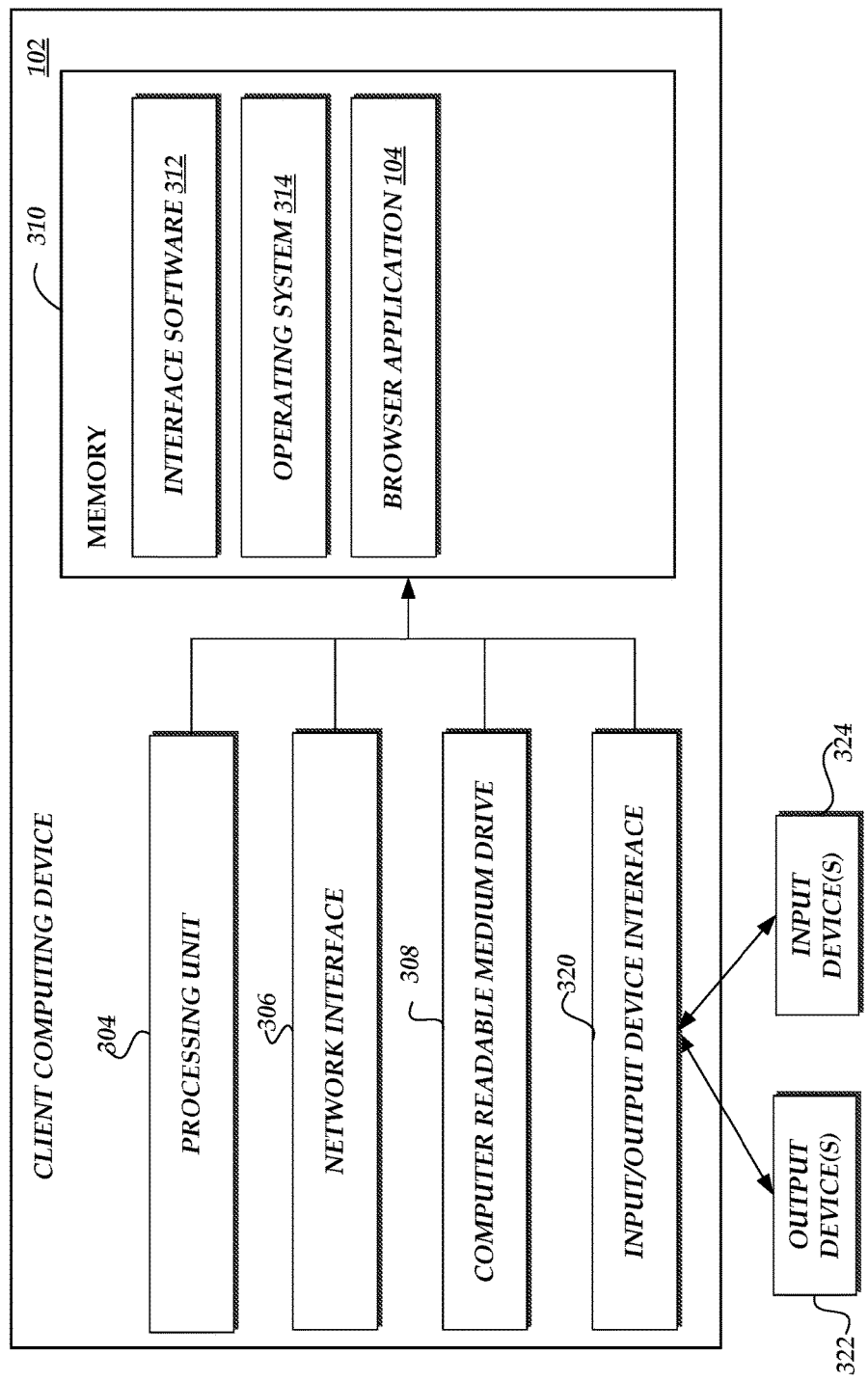
FIG. 3 is a block diagram of illustrative components of a computing device for use in configuring peripheral devices and transmitting peripheral device communications in accordance with one or more embodiments of the present application.

FIG. 3 depicts one embodiment of an architecture of an illustrative a computing device 102 that can generate and process user commands or information in accordance with the present application. The general architecture of the computing device 102 depicted in FIG. 3 includes an arrangement of computer hardware and software components that may be used to implement aspects of the present disclosure. As illustrated, the computing device 102 includes a processing unit 304, a network interface 306, a computer-readable medium drive 308, an input/output device interface 320, optional output device(s) 322, and input device(s) 324, all of which may communicate with one another by way of a communication bus.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and the input/output device interface 320. The input/output device interface 320 may accept input from peripheral devices, such as input devices 324, which as previously described can include hardware components such as a keyboard, mouse, digital pen, etc. The input/output interface 320 can also generate outputs to devices, such as output device(s) 322, which can include hardware components such as displays, speakers, etc. The inputs to the computing device 102 may be internal to the device, such as contained within a housing, or external to the device and connected via a wired or wireless interface. Additionally, as will be described in detail below the input peripheral device(s) 324 and output peripheral device(s) 322 can utilize the network interface 306 and associated software applications to exchange content with the network monitoring and capacity planning service 128 (FIG. 1).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes an application 104 for communicating with the service provider system 110. More specifically, application 104 can be utilized to communicate with the network monitoring and capacity service 128 to configure the network capacity service, such as verifying usage patterns, modifying usage patterns, processing deviation information related to usage patterns, implementing error mitigation techniques, and the like.

Figure 4:
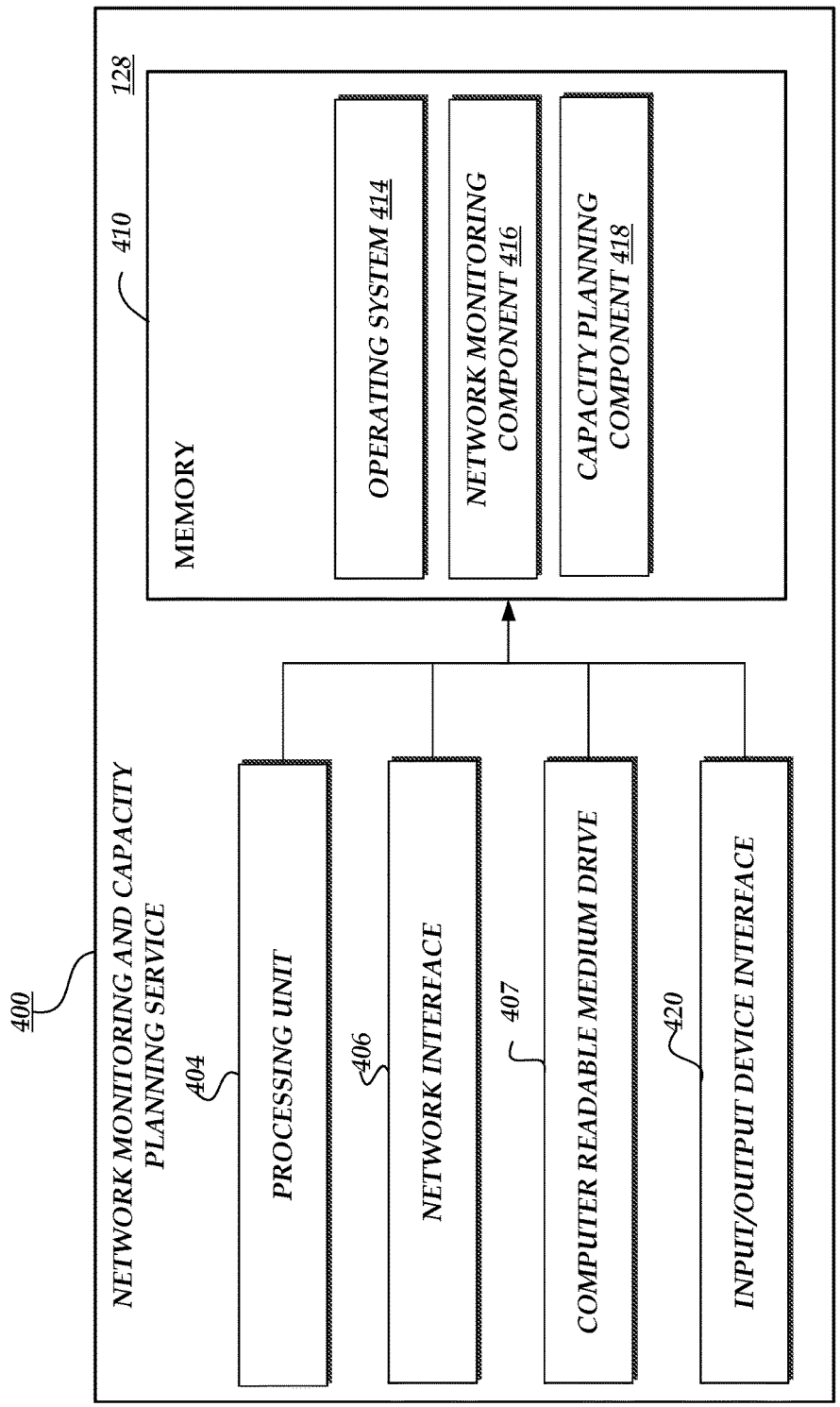
FIG. 4 is a block diagram of illustrative components of a network capacity service in accordance with one or more embodiments of the present application.

As discussed above, in some embodiments, aspects of the present application can include network components 400 that facilitate the configuration of the network monitoring and capacity planning service. FIG. 4 depicts one embodiment of an architecture of an illustrative network monitoring and capacity planning service component 128 in communication with the service provider network 110 and computing devices 102 in accordance with the present application. The general architecture of the network monitoring and capacity planning service component 128 depicted in FIG. 4 includes an arrangement of computer hardware and software components that may be used to implement aspects of the present disclosure. As illustrated, the network monitoring and capacity planning service component 128 includes a processing unit 404, a network interface 406, a computer-readable medium drive 407, an input/output device interface 420, all of which may communicate with one another by way of a communication bus.

The network interface 406 may provide connectivity to one or more networks or computing systems, such as the network 140 of FIG. 1. The processing unit 404 may thus receive information and instructions from other computing systems or services via a network. The processing unit 404 may also communicate to and from memory 410 and further provide output information. In some embodiments, the network monitoring and capacity planning service component 128 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the network routing component. The memory 210 may further include computer program instructions and other information for implementing aspects of the present disclosure. For example, in one embodiment, the memory 210 includes a network monitoring component 416 that corresponds to functionality to determine usage patterns for operations information and process metric information correlated to determined usage patterns as will be described illustratively with regard to FIGS. 6-8. In another example, in one embodiment, the memory 210 includes a capacity planning component 418 that corresponds to functionality to determine network components implementation based on usage patterns for operations.

Figure 5A:
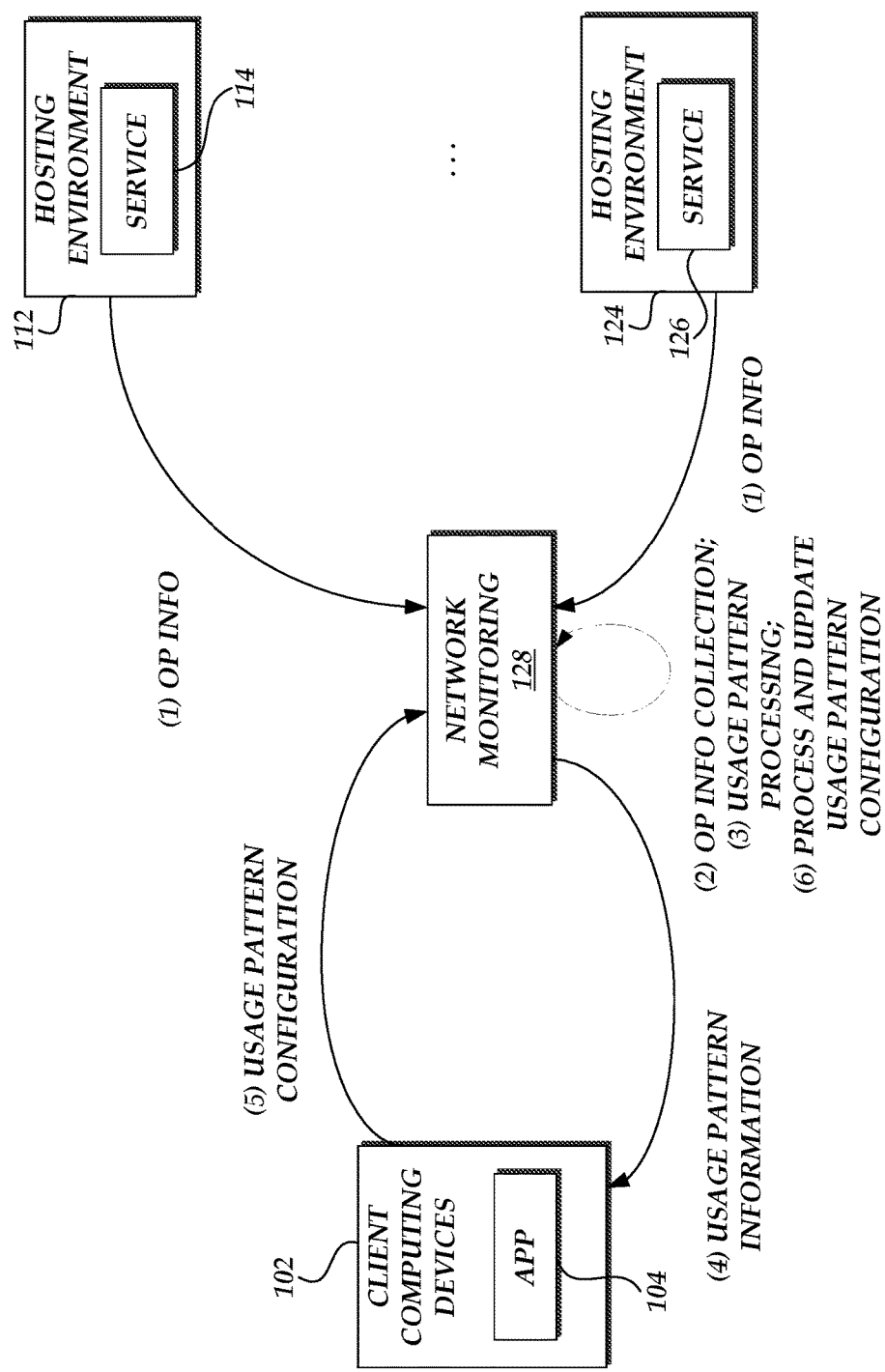
FIGS. 5A-5C are block diagrams of the logical network of FIG. 1 illustrating the processing of operations information to identify usage patterns and the utilization of usage patterns for network monitoring and capacity planning in accordance with one or more embodiments of the present application.
Figure 5B:
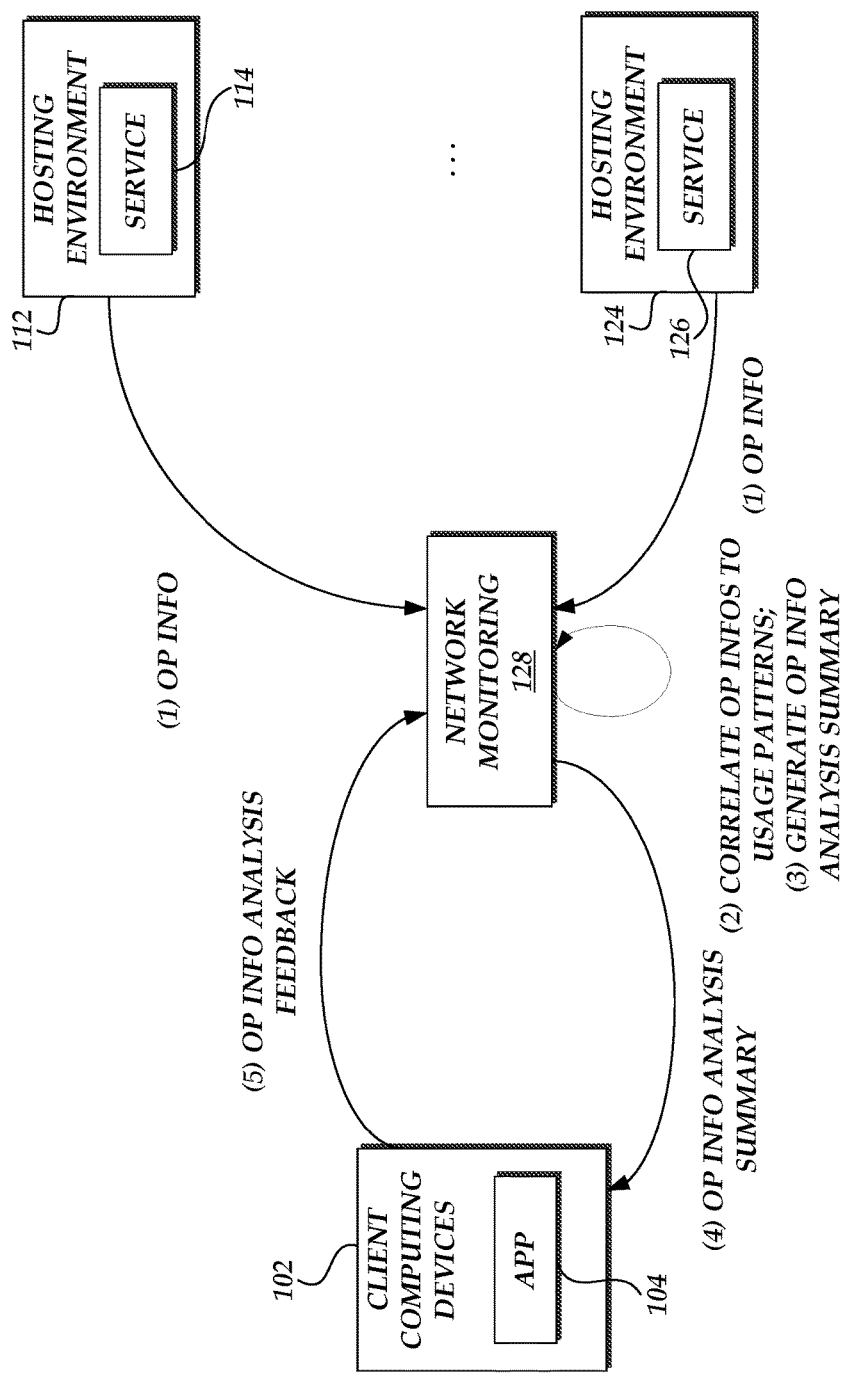
Figure 5C:
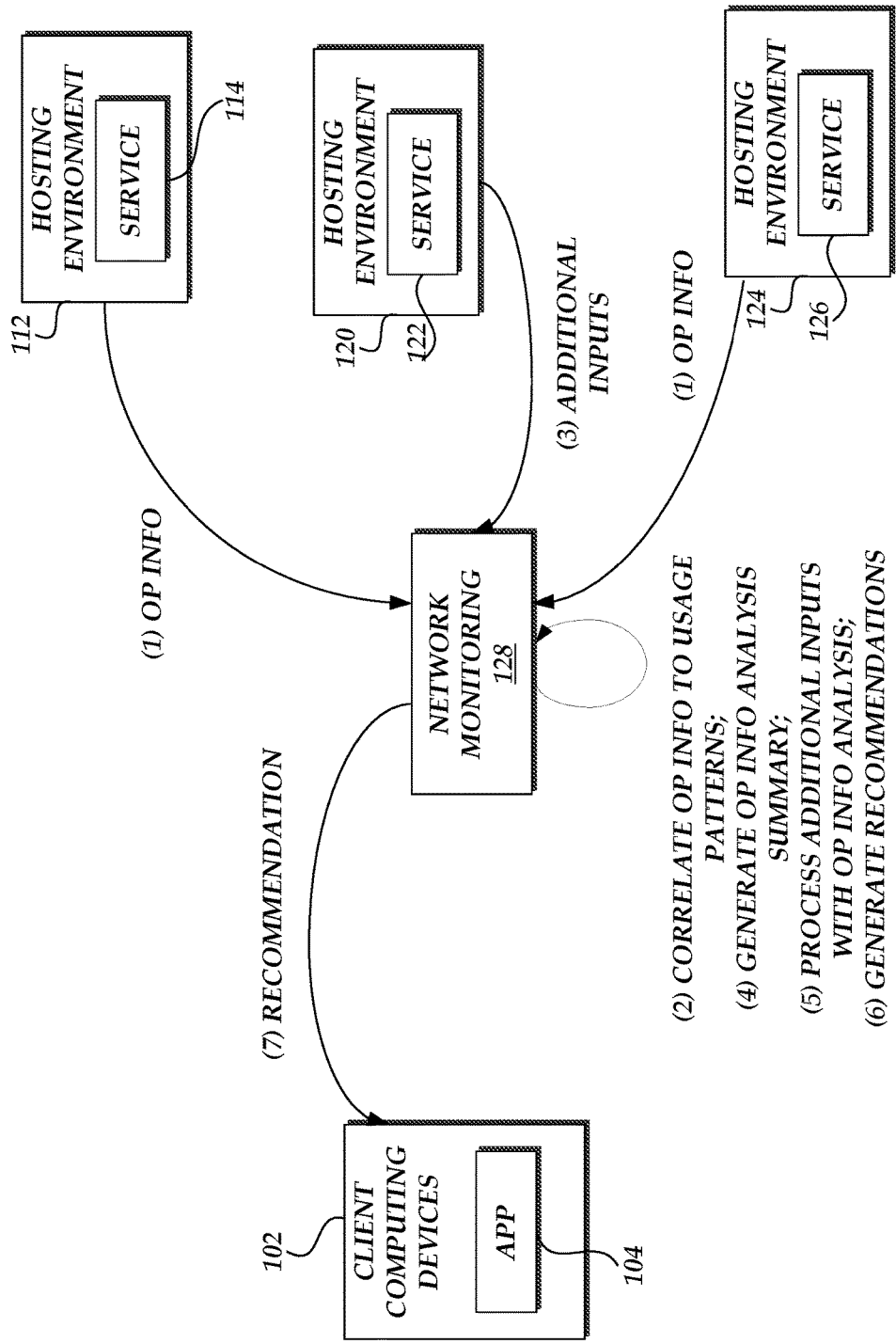

Turning now to FIGS. 5A-5C, one or more embodiments illustrative of interactions between the components of the logical network 100 for configuration of the network capacity service will be described. FIG. 5A will be described with regard to one embodiment in which determination of usage patterns based on operations information is provided by one or more hosted virtual machine instances. FIG. 5B will be described with regard to one embodiment in which determination of whether incoming operations information is provided by one or more hosted virtual machine instances deviates from usage patterns. FIG. 5C will be described with regard to one embodiment in which determination of whether casual relationships exist between deviations in usage patterns and other information is related to the execution of hosted virtual machine instances. Accordingly, although FIGS. 5A-5C will be described with regard to one or more embodiments, illustrating interaction between a client computing device 102, the network monitoring and capacity planning service component 128, and one or more virtual machine instances, one skilled in the relevant art will appreciate that the present application is not limited to interaction by any specific type of computing device or virtual desktop instances.

With reference to FIG. 5A, in one embodiment, at (1), one or more hosted environments (or groups of hosting environments), can be configured to begin transmitting performance information. As previously described, illustratively, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. In an embodiment, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another embodiment, the agent 218 can collect operations information related to measured packet loss rates, network packet retransmission rates, etc. In still other examples, the agent 218 can collect operations information related to times and success rates for various virtual machine resource I/O operations, such as data reads or data write operations. In another embodiment, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

At (2), the network monitoring and capacity planning service 128 collects the individual operations information to form a set of processing information. The network monitoring and capacity planning service 128 can collect individual processing information from a number of hosted virtual machines instances, such as from virtual machine instances on hosting environment 112 and 124, that may be associated with a particular service and a particular client. The network monitoring and capacity planning service 128 can store the collected information and further identify collected operations information as being associated with one or more clients or services. In this regard, in one embodiment, individual operations information may be unique to individual services or clients or, in other embodiments, individual operations information may be applicable to multiple services or customers.

At (3), the network monitoring and capacity planning service 128 processes the set of operations information to determine one or more usage patterns. In one embodiment, the network monitoring and capacity planning service 128 processes the set of operations information to find one or more non-random patterns or occurrences in the set of operations information. The network monitoring and capacity planning service 128 does not need to have any prior information of the operations information (e.g., product agnostic) or any information about the range of possible values for the operations information. The non-random patterns can correspond to values for one or more operations information for a defined period of time, such as values per minute, per hour, per day, per week, and the like. In one example, the values can correspond to a repetition of a value, such as peak, over the period of time. In another example, the values can correspond to a constant value for operations information over a period of time. In still a further example, the values can correspond to a defined change of values, such as linear or exponential increase/decrease, over the period of time. In other embodiments, the usage patterns can be based on a combination of multiple operations information values. Additionally, the network monitoring and capacity planning service 128 can process the operations information to normalize the incoming metric data. In still further embodiments, the network monitoring and capacity planning service 128 can utilize a cumulative set of operations information that can identify usage patterns over various periods of time, such as hourly usage patterns, daily usage patterns, weekly usage patterns, and the like. For example, collected operations information may not be indicative of a determined hourly usage pattern, but may be part of a weekly usage pattern. The network monitoring and capacity planning service 128 can also utilize other statistical processes, such as standard deviation processing, to identify one or more thresholds.

At (4), the network monitoring and capacity planning service 128 transmits the determined usage patterns to a client computing device 102. In one embodiment, the network monitoring and capacity planning service 128 can transmit the determined usage patterns to a system administrator. The network monitoring and capacity planning service 128 can request verification from a user that the determined usage pattern is valid. In another example, the network monitoring and capacity planning service 128 can enable the user to make modifications of the usage patterns, such as by adjusting operations information values or time values. In still another example, the network monitoring and capacity planning service 128 can provide the usage pattern information and identify whether the specified service has sufficient capacity to provide services based on anticipated usage patterns. In one embodiment, the client computing device 102 can generate one or more graphical interfaces to elicit inputs from the user that will be generally referred to as usage pattern configuration information.

At (5), the network monitoring and capacity planning service 128 receives usage pattern configuration from the user. At (6), the network monitoring and capacity planning service 128 processes the usage pattern configuration information and updates determined usage patterns. In one embodiment, the network monitoring and capacity planning service 128 can utilize additional values to modify the usage patterns or make additional usage patterns. Additionally, the network monitoring and capacity planning service 128 can utilize input from the user, such as possible additional values, to repeat the determination of usage patterns. In this example, the network monitoring and capacity planning service 128 may not necessarily make changes to usage patterns. At this point, the network monitoring and capacity planning service 128 can save the usage patterns for processing as will be described below.

In some embodiments, the network monitoring and capacity planning service 128 can generate the usage patterns from a set of operations information and then identify potential compliance or deviations from the determined usage patterns from the same set of operations information. In other embodiments, the network monitoring and capacity planning service 128 can utilize a first set of operations information, such as a cumulative set of operations information, to determine usage patterns and then utilize the usage patterns to identify possible deviations/compliance with the usage patterns from a second set of operations information, such as a current set of operations information. FIG. 5B will illustrate one or more embodiments in which the processing of a set of operations information to identify possible deviations/compliance with the usage patterns irrespective of whether the same set of operations information is utilized to determine the usage patterns or a different set of operations information is utilized to determine the usage patterns.

With reference to FIG. 5B, in one embodiment, at (1), one or more hosted environments (or groups of hosting environments), can be configured to begin transmitting performance information. As previously described, illustratively, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. Illustratively, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another example, the agent 218 can collect operations information related to measured packet loss rates, network packet retransmission rates, etc. In still other examples, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

At (2), the network monitoring and capacity planning service 128 correlates the collected set of operations information according to the previously determined, or contemporaneously determined, usage patterns. In one embodiment, the network monitoring and capacity planning service 128 can correlate the set of operations information by identifying operations information that is compliant with the usage patterns. In this aspect, the network monitoring and capacity planning service 128 can identify operations information values or network monitoring and capacity planning service 128 general that are substantially similar to an expect value or range of values. In another embodiment, the network monitoring and capacity planning service 128 can correlate the set of operations information by identifying operations information that is not compliant or deviates from the usage patterns. In this aspect, the network monitoring and capacity planning service 128 can identify operations information values or network monitoring and capacity planning service 128 general that exceed an expect value or range of values, such as a statistically significant deviation or pre-determined deviation. In a further embodiment, the network monitoring and capacity planning service 128 can correlate the set of operations information by identifying operations information that was expected from the usage patterns, but was not present in the set of operations information. In this aspect, the network monitoring and capacity planning service 128 can identify operations information values or network monitoring and capacity planning service 128 general that are substantially zero or fall below a minimum threshold. For operations information values that are determined to be non-compliant, the network monitoring and capacity planning service 128 can also identify the value and net difference from the expected value.

At (3), the network monitoring and capacity planning service 128 can generate a summary of the correlation of the set of processing information with the usage patterns. In one embodiment, the summary can correspond to one or more visual representations of the set of operations information, such as a graph of operations information according to time.

At (4), the network monitoring and capacity planning service 128 transmits the summary information to one or more client computing devices 102 (or other devices). The network monitoring and capacity planning service 128 can also utilize one or more application program interfaces ("APIs") that transmit the summary information to one or more client computing devices 102. In one or more embodiments, the network monitoring and capacity planning service 128 can transmit different visualizations of the summary information or different subsets of the summary information based on a role of individual users, authorization information or validation of security information. For example, the network monitoring and capacity planning service 128 can transmit a general summary of a determined deviation of operations information to a general set of users, but may only transmit the detailed values of the exceeded operations information to a user with specific credentials, such as a system administrator.

In some embodiments, one or more users can provide feedback corresponding to the operations information analysis. As illustrated in FIG. 5B, at (5), the users can transmit operations information feedback to the network monitoring and capacity planning service 128. In one embodiment, the feedback can include a confirmation regarding the determined deviation/non-compliance from usage pattern or confirmation regarding a determined compliance. In another embodiment, the feedback can include an identification of one or more mitigation techniques or corrective measures that may be implemented based on the identified usage patterns. For example, the network monitoring and capacity planning service 128 can implement a capacity planning routine that identifies and implements the configuration of additional computing resources based on the identified usage pattern. In another example, the network monitoring and capacity planning service 128 can cause the implementation of one or more corrective measures based on determined deviations/non-compliance, such as causing a current instantiation of a virtual machine instance to be migrated, configuring a service to operate in a different configuration or mode, and the like. In still a further embodiment, the network monitoring and capacity planning service 128 can provide additional contextual information, such as identification information, information identifying additional processes or circumstances related to the implementation of the service(s), or other information that may be utilized to identify a source of the deviation/non-compliance.

In some embodiments, the network monitoring and capacity planning service 128 can generate the usage patterns from a set of operations information, identify potential compliance or deviations from the determined usage patterns from the same set of operations information, and then further conduct additional analysis or associations to provide recommendations regarding possible sources for determined deviations from the usage patterns. FIG. 5C will illustrate one embodiment in which the processing of a set of operations information to identify possible deviations/compliance with the usage patterns and then conduct additional analysis of other inputs to attempt to provide recommendations regarding possible sources for the determined deviation.

With reference to FIG. 5C, in a manner described similarly with one or more embodiments of FIGS. 5A and 5B, in one embodiment, at (1), one or more hosted environments (or groups of hosting environments), can be configured to begin transmitting performance information. As previously described, illustratively, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. In one embodiment, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another example, the agent 218 can collect operations information related to measured packet loss rates, network packet retransmission rates, etc. In still other examples, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

At (2), the network monitoring and capacity planning service 128 correlates the collected set of operations information according to the previously determined, or contemporaneously determined, usage patterns. In one embodiment, the network monitoring and capacity planning service 128 can correlate the set of operations information by identifying operations information that is compliant with the usage patterns. In this embodiment, the network monitoring and capacity planning service 128 can identify operations information values or network monitoring and capacity planning service 128 general that are substantially similar to an expect value or range of values. In another embodiment, the network monitoring and capacity planning service 128 can correlate the set of operations information by identifying operations information that is not compliant or deviates from the usage patterns. In this embodiment, the network monitoring and capacity planning service 128 can identify operations information values or network monitoring and capacity planning service 128 general that exceed an expect value or range of values, such as a statistically significant deviation or pre-determined deviation. In a further embodiment, the network monitoring and capacity planning service 128 can correlate the set of operations information by identifying operations information that was expected from the usage patterns, but was not present in the set of operations information. In this embodiment, the network monitoring and capacity planning service 128 can identify operations information values or network monitoring and capacity planning service 128 general that are substantially zero or fall below a minimum threshold. For operations information values that are determined to be non-compliant, the network monitoring and capacity planning service 128 can also identify the value and net difference from the expected value.

At (3), the network monitoring and capacity planning service 128 obtains additional information related to the operation of service. In one embodiment, the additional information can correspond to an identification of the processes that were being executed, information related to the execution of the service, information identifying additional information utilized by the service, and the like. The information can be provided by the instantiated virtual machine instances that generated the operations information. Additionally, the network monitoring and capacity planning service 128 can receive information from additional or alternative instantiated virtual machine instances. At (4), the network monitoring and capacity planning service 128 can generate a summary of the correlation of the set of processing information with the usage patterns. In one embodiment, the summary can correspond to one or more visual representations of the set of operations information, such as a graph of operations information according to time. At (4), the network monitoring and capacity planning service 128 transmits the summary information to one or more client computing devices 102 (or other devices). The network monitoring and capacity planning service 128 can also utilize one or more application program interfaces ("APIs") that transmit the summary information to one or more client computing devices 102. In some embodiments, the network monitoring and capacity planning service 128 can transmit different visualizations of the summary information or different subsets of the summary information based on a role of individual users, authorization information or validation of security information. For example, the network monitoring and capacity planning service 128 can transmit a general summary of a determined deviation of operations information to a general set of users, but may only transmit the detailed values of the exceeded operations information to a user with specific credentials, such as a system administrator.

At (5), the network monitoring and capacity planning service 128 processes the additional inputs, usage patterns and deviation information and generates recommendations regarding possible sources for the deviations at (6). In one embodiment, the network monitoring and capacity planning service 128 can implement machine learning algorithms that attempts to associate the one or more inputs as being associated with the determined deviation of the usage patterns. The network monitoring and capacity planning service 128 can attempt to identify one or more common elements that may occur in association with the determined deviation. Such inputs to the machine learning algorithms can include specific functions that were being executed, information provided to the network monitoring and capacity planning service 128, intermediate information generated by the network monitoring and capacity planning service 128, location information related to the physical computing device implementing the service, and the like. In this regard, the network monitoring and capacity planning service 128 can accept any form of input and look for commonalities. In some additional embodiments, the network monitoring and capacity planning service 128 can utilize testing data to tune the machine learning algorithms.

Figure 6:
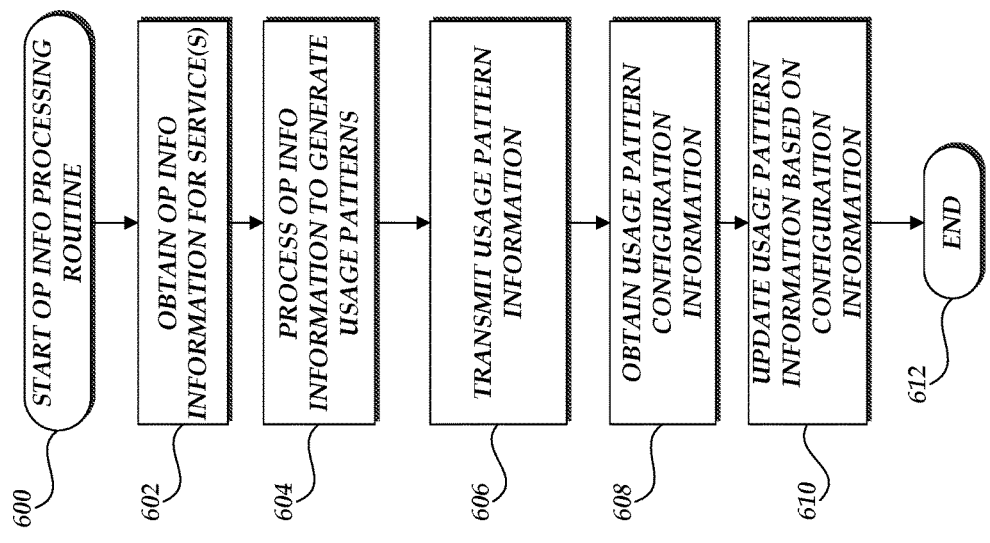
FIG. 6 is a flow diagram illustrative of a network service operations information processing routine by a computing device in accordance with one or more embodiments of the present application.

Turning now to FIG. 6, a routine 600 implemented by a computing device for network operations information processing will be described. In one embodiment, routine 600 will be described with regard to implementation by a network monitoring and capacity planning service 128 (FIG. 1). However, routine 600 may be implemented by other computing devices, in whole or in part in other embodiments. At block 602, the network monitoring and capacity planning service 128 obtains operations information for one or more services. In one embodiment, one or more hosted environments (or groups of hosting environments), can be configured to begin transmitting performance information. As previously described, illustratively, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. Illustratively, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another example, the agent 218 can collect operations information related to measured packet loss rates, network packet retransmission rates, etc. In still other examples, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

As described above, in one embodiment, the network monitoring and capacity planning service 128 collects the individual operations information to form a set of processing information. The network monitoring and capacity planning service 128 can collect individual processing information from a number of hosted virtual machines instances, such as from virtual machine instances on hosting environment 112 and 124, that may be associated with a particular service and a particular client. The network monitoring and capacity planning service 128 can store the collected information and further identify collected operations information as being associated with one or more clients or services. In this regard, individual operations information may be unique to individual services or clients or in some embodiments, individual operations information may be applicable to multiple services or customers.

At block 604, the network monitoring and capacity planning service 128 processes the set of operations information to determine one or more usage patterns. In one embodiment, the network monitoring and capacity planning service 128 processes the set of operations information to find one or more non-random patterns or occurrences in the set of operations information. The network monitoring and capacity planning service 128 does not need to have any prior information of the operations information (e.g., product agnostic) or any information about the range of possible values for the operations information. The non-random patterns can correspond to values for one or more operations information for a defined period of time, such as values per minute, per hour, per day, per week, and the like. In one example, the values can correspond to a repetition of a value, such as peak, over the period of time. In another example, the values can correspond to a constant value for operations information over a period of time. In still a further example, the values can correspond to a defined change of values, such as linear or exponential increase/decrease, over the period of time. In some embodiments, the usage patterns can be based on a combination of multiple operations information values. Additionally, in one embodiment, the network monitoring and capacity planning service 128 can process the operations information to normalize the incoming metric data. In still further embodiments, the network monitoring and capacity planning service 128 can utilize a cumulative set of operations information that can identify usage patterns over various periods of time, such as hourly usage patterns, daily usage patterns, weekly usage patterns, and the like. For example, collected operations information may not be indicative of a determined hourly usage pattern, but may be part of a weekly usage pattern. The network monitoring and capacity planning service 128 can also utilize other statistical processes, such as standard deviation processing, to identify one or more thresholds.

At block 606, the network monitoring and capacity planning service 128 transmits the determined usage patterns to a client computing device 102. In one embodiment, the network monitoring and capacity planning service 128 can transmit the determined usage patterns to a system administrator. The network monitoring and capacity planning service 128 can request verification from a user that the determined usage pattern is valid. In another embodiment, the network monitoring and capacity planning service 128 can enable the user to make modifications of the usage patterns, such as by adjusting operations information values or time values. In still another embodiment, the network monitoring and capacity planning service 128 can provide the usage pattern information and identify whether the specified service has sufficient capacity to provide services based on anticipated usage patterns. In one embodiment, the client computing device 102 can generate one or more graphical interfaces to elicit inputs from the user that will be generally referred to as usage pattern configuration information.

At block 608, the network monitoring and capacity planning service 128 receives usage pattern configuration from the user. At block 610, the network monitoring and capacity planning service 128 processes the usage pattern configuration information and updates determined usage patterns. In one embodiment, the network monitoring and capacity planning service 128 can utilize additional values to modify the usage patterns or make additional usage patterns. Additionally, in other embodiments, the network monitoring and capacity planning service 128 can utilize input from the user, such as possible additional values, to repeat the determination of usage patterns. In this example, the network monitoring and capacity planning service 128 may not necessarily make changes to usage patterns. At this point, the network monitoring and capacity planning service 128 can save the usage patterns for processing as will be described below. The routine 600 terminates at block 612.

Figure 7:
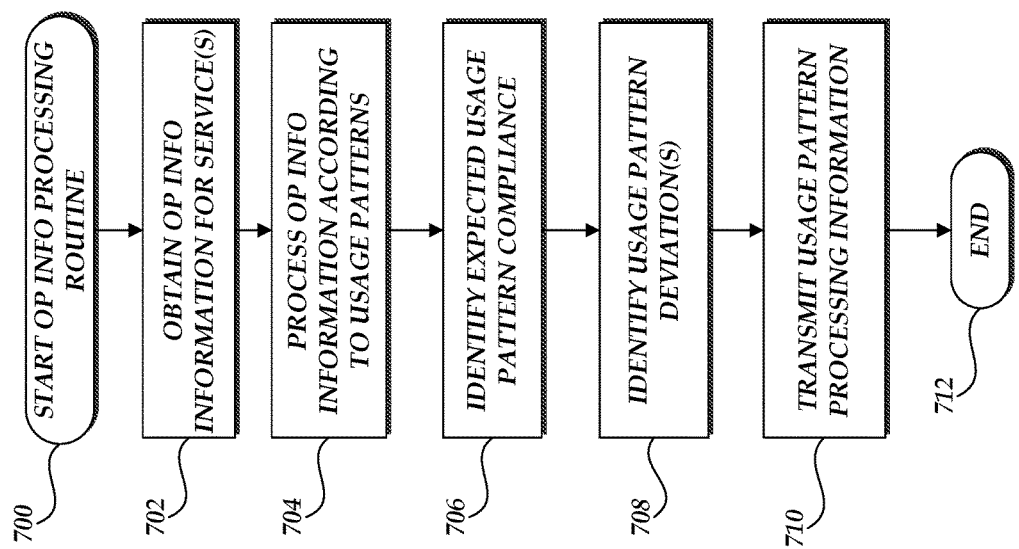
FIG. 7 is a flow diagram illustrative of a network service operations information processing routine by a computing device in accordance with one or more embodiments of the present application.

Turning now to FIG. 7, a routine 700 implemented by a computing device for network operations information processing will be described. In one embodiment, routine 600 will be described with regard to implementation by a network monitoring and capacity planning service 128 (FIG. 1). However, routine 700 may be implemented by other computing devices, in whole or in part, in other embodiments. At block 702, the network monitoring and capacity planning service 128 obtains a set of processing information to be monitored. one or more hosted environments (or groups of hosting environments), can be configured to begin transmitting performance information. As previously described, in one embodiment, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. In one embodiment, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another example, the agent 218 can collect operations information related to measured packet loss rates, network packet retransmission rates, etc. In still other examples, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

At block 704, the network monitoring and capacity planning service 128 correlates the collected set of operations information according to the previously determined, or contemporaneously determined, usage patterns. In one embodiment, at block 706, the network monitoring and capacity planning service 128 can correlate the set of operations information by identifying operations information that is compliant with the usage patterns. In this embodiment, the network monitoring and capacity planning service 128 can identify operations information values or network monitoring and capacity planning service 128 general that are substantially similar to an expect value or range of values. In another embodiment, at block 708, the network monitoring and capacity planning service 128 can correlate the set of operations information by identifying operations information that is not compliant or deviates from the usage patterns. In this embodiment, the network monitoring and capacity planning service 128 can identify operations information values or network monitoring and capacity planning service 128 general that exceed an expect value or range of values, such as a statistically significant deviation or predetermined deviation. In a further embodiment, the network monitoring and capacity planning service 128 can correlate the set of operations information by identifying operations information that was expected from the usage patterns, but was not present in the set of operations information. In this embodiment, the network monitoring and capacity planning service 128 can identify operations information values or network monitoring and capacity planning service 128 general that are substantially zero or fall below a minimum threshold. For operations information values that are determined to be non-compliant, the network monitoring and capacity planning service 128 can also identify the value and net difference from the expected value.

At block 710, the network monitoring and capacity planning service 128 can generate a summary of the correlation of the set of processing information with the usage patterns. In one embodiment, the summary can correspond to one or more visual representations of the set of operations information, such as a graph of operations information according to time. The network monitoring and capacity planning service 128 transmits the summary information to one or more client computing devices 102 (or other devices). The network monitoring and capacity planning service 128 can also utilize one or more application program interfaces ("APIs") that transmit the summary information to one or more client computing devices 102. In some embodiments, the network monitoring and capacity planning service 128 can transmit different visualizations of the summary information or different subsets of the summary information based on a role of individual users, authorization information, or validation of security information. For example, the network monitoring and capacity planning service 128 can transmit a general summary of a determined deviation of operations information to a general set of users, but may only transmit the detailed values of the exceeded operations information to a user with specific credentials, such as a system administrator. At block 712, the routine 700 terminates.

Although not discussed in routine 700, one or more users can provide feedback corresponding to the operations information analysis in one or more embodiments. In such embodiments, the users can transmit operations information feedback to the network monitoring and capacity planning service 128. In one embodiment, the feedback can include a confirmation regarding the determined deviation/non-compliance from usage pattern or confirmation regarding a determined compliance. In another embodiment, the feedback can include an identification of one or more mitigation techniques or corrective measures that may be implemented based on the identified usage patterns. For example, the network monitoring and capacity planning service 128 can implement a capacity planning routine that identifies and implements the configuration of additional computing resources based on the identified usage pattern. In another example, the network monitoring and capacity planning service 128 can cause the implementation of one or more corrective measures based on determined deviations/non-compliance, such as causing a current instantiation of a virtual machine instance to be migrated, configuring a service to operate in a different configuration or mode, and the like. In still a further embodiment, the network monitoring and capacity planning service 128 can provide additional contextual information, such as identification information, information identifying additional processes or circumstances related to the implementation of the service(s), or other information that may be utilized to identify a source of the deviation/non-compliance.

Figure 8:
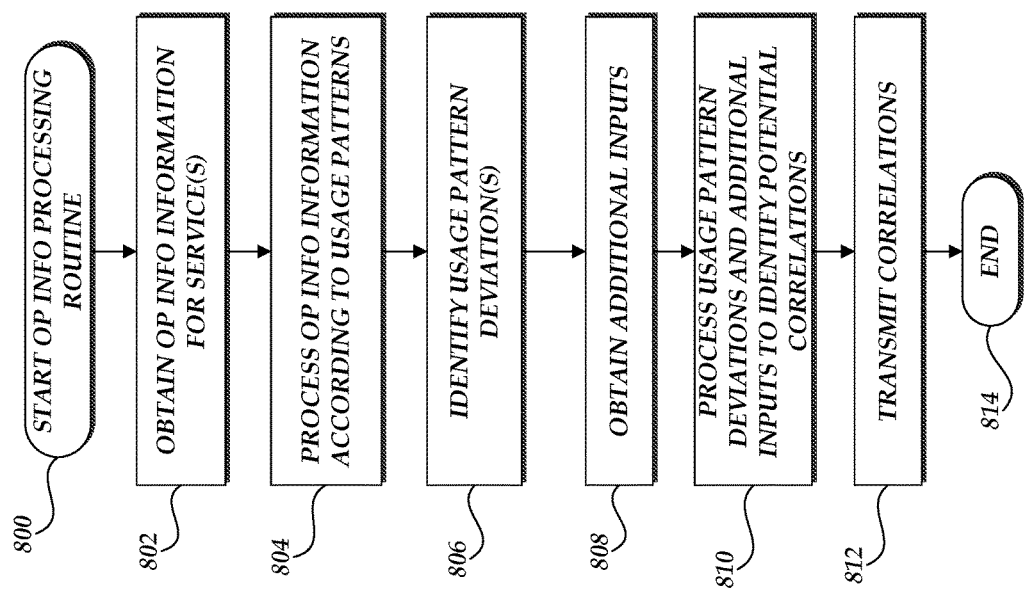
FIG. 8 is a flow diagram illustrative of a network service operations information processing routine by a computing device in accordance with one or more embodiments of the present application.

Turning now to FIG. 8, a routine 800 implemented by a computing device for network operations information processing will be described. In one embodiment, routine 800 will be described with regard to implementation by a network monitoring and capacity planning service 128 (FIG. 1). However, routine 800 may be implemented by other computing devices, in whole or in part, in other embodiments. At block 802, the network monitoring and capacity planning service 128 obtains operations information. One or more hosted environments (or groups of hosting environments), can be configured to begin transmitting performance information. As previously described, in one embodiment, individual devices can utilize software applications or agents that can transmit performance information to the network capacity service. In one example, the network capacity service 128 can implement a push model in which the individual agents periodically transmit requests for collected monitoring information (such as via a schedule). In another example, the network capacity service 128 can implement a pull model in which the network capacity service establishes communications with individual agents to cause the agents to transmit the performance information to the network capacity service. In one embodiment, the network capacity service 128 can specify the specific performance information transmitted by the individual computing devices, including the specification of communication templates according to the aggregation information. As also described above, the performance information can include, but is not necessarily limited to, file system information, network interface information, and resource consumption information. For example, the agent 218 on the hosted environment 200 (FIG. 2) can collect information related to CPU utilization during a defined time window or a specified time intervals. In another example, the agent 218 can collect operations information related to measured packet loss rates, network packet retransmission rates, etc. In still other examples, the agent 218 can collect operations information related to times and success rates for various virtual machine resource I/O operations, such as data reads or data write operations. In still a further example, the agent 218 can collect any error conditions or error logs generated during the operation of the hosted environment 200. Such information can also be provided by additional processes or software applications to review the collected operations information and make determinations regarding potential errors or conduct additional processing/analysis on the collected operations information.

At block 804, the network monitoring and capacity planning service 128 correlates the collected set of operations information according to the previously determined, or contemporaneously determined, usage patterns. In one embodiment, the network monitoring and capacity planning service 128 can correlate the set of operations information by identifying operations information that is compliant with the usage patterns. At block 806, the network monitoring and capacity planning service 128 can identify operations information values or network monitoring and capacity planning service 128 general that exceed an expect value or range of values, such as a statistically significant deviation or pre-determined deviation. At block 806, the network monitoring and capacity planning service 128 can correlate the set of operations information by identifying operations information that was expected from the usage patterns, but was not present in the set of operations information. In this embodiment, the network monitoring and capacity planning service 128 can identify operations information values or network monitoring and capacity planning service 128 general that are substantially zero or fall below a minimum threshold. For operations information values that are determined to be non-compliant, the network monitoring and capacity planning service 128 can also identify the value and net difference from the expected value.

At block 808, the network monitoring and capacity planning service 128 obtains additional information related to the operation of service. In one embodiment, the additional information can correspond to an identification of the processes that were being executed, information related to the execution of the service, information identifying additional information utilized by the service, and the like. The information can be provided by the instantiated virtual machine instances that generated the operations information. Additionally, the network monitoring and capacity planning service 128 can receive information from additional or alternative instantiated virtual machine instances.

At block 810, the network monitoring and capacity planning service 128 processes the additional inputs, usage patterns and deviation information and generates recommendations regarding possible sources for the deviations at block 812. In one embodiment, the network monitoring and capacity planning service 128 can implement machine learning algorithms that attempts to associate the one or more inputs as being associated with the determined deviation of the usage patterns. The network monitoring and capacity planning service 128 can attempt to identify one or more common elements that may occur in association with the determined deviation. Such inputs to the machine learning algorithms can include specific functions that were being executed, information provided to the network monitoring and capacity planning service 128, intermediate information generated by the network monitoring and capacity planning service 128, location information related to the physical computing device implementing the service, and the like. In this regard, the network monitoring and capacity planning service 128 can accept any form of input and look for commonalities. In some additional embodiments, the network monitoring and capacity planning service 128 can utilize testing data to tune the machine learning algorithms. At block 814, the routine 800 terminates.

Figure 9:
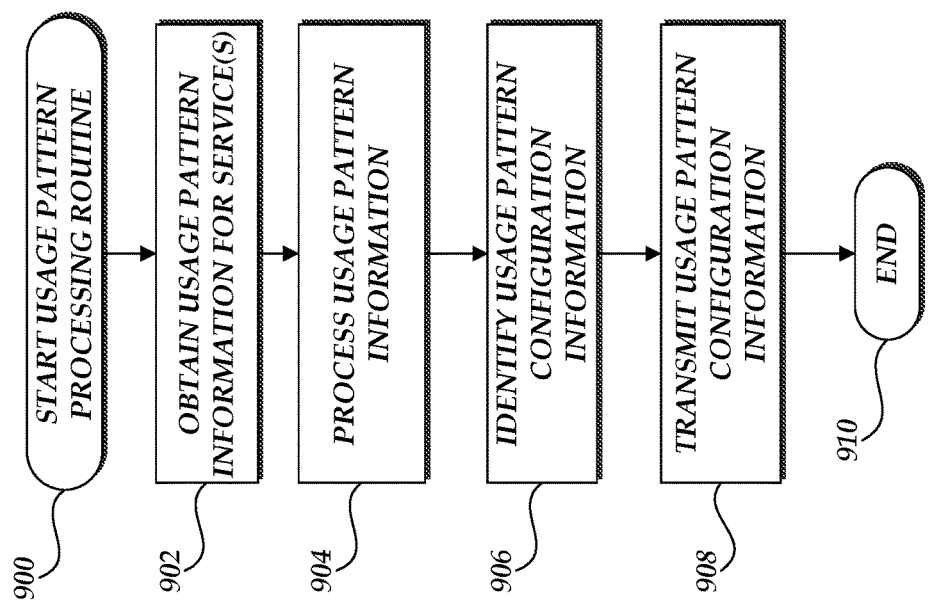
FIG. 9 is a flow diagram illustrative of a usage pattern processing routine by a computing device in accordance with one or more embodiments of the present application.

Turning now to FIG. 9, a routine 900 implemented by a computing device for network usage pattern processing will be described. In one embodiment, routine 900 will be described with regard to implementation by a client computing device 102 (FIG. 1). However, routine 900 may be implemented by other computing devices, in whole or in part, in other embodiments. At block 902, the client computing device 102 obtains determined usage patterns to a client computing device 102. In manner described above, the network monitoring and capacity planning service 128 can transmit the determined usage patterns to the client computing device 102, such as for a system administrator. In one embodiment, the network monitoring and capacity planning service 128 can request verification from the client computing device 102 that the determined usage pattern is valid. In another embodiment, the network monitoring and capacity planning service 128 can enable the client computing device 102 to make modifications of the usage patterns, such as by adjusting operations information values, time values and the like. In still another embodiment, the network monitoring and capacity planning service 128 can provide the usage pattern information and identify whether the specified service has sufficient capacity to provide services based on anticipated usage patterns. In one embodiment, the client computing device 102 can generate one or more graphical interfaces to elicit inputs from the user that will be generally referred to as usage pattern configuration information.

At block 904, the client computing device 102 processes the usage pattern information and identifies usage pattern configuration information at block 906. In one embodiment, the client computing device 102 can generate one or more interfaces, such as a graphical user interface that identifies the determined usage patterns. For example, a graphical user interface may generate a plot of one or more operations values over a defined time period that identified the determined non-random values, such as repeat values, increasing values, decreasing values, or other statistically significant values. In embodiments, in which the usage pattern configuration includes a verification of the determined usage patterns, the graphical interface may include controls for validating the usage patterns. Additionally, in other embodiments, the graphical user interface can include additional inputs for allowing a user to provide additional information about the usage patterns, such as identifying one or more services that may be the source of the operations information, identifying one or more processes or functions that were requested during the time represented by the usage pattern, and the like.

In another embodiment, a graphical user interface can include additional controls that facilitate the modification of usage pattern information. In one example, a graphical user interface may include controls that facilitate the modification of operations information values or a range of values, such as by inputting additional values or manipulating display objects related to the determined values. In another example, a graphical user interface can also include controls for providing additional operations information, such as by specifying operations information values or linking additional operations information sources, that can be used to update the previously determined parameters.

In still a further embodiment, a graphical user interface can include an identification of capacity planning information, such as an assessment of whether current service provider resources are capable of supporting the determined usage patterns, a potential financial impact of the service provider supporting the determined usage patterns, or recommendations regarding whether the current configuration of service provider resources can be characterized as optimal or suggesting alternative service provider resource configurations. In this embodiment, the graphical user interface can include controls for allowing a user, such as a system administrator, to generate requests for additional services or supplemental services as part of the usage pattern configuration.

At block 908, the client computing device 102 transmits the usage pattern configuration information. In one embodiment, the client computing device 102 can transmit the usage pattern configuration information to the network monitoring and capacity planning service 128. As described above, the network monitoring and capacity planning service 128 processes the usage pattern configuration information and updates determined usage patterns. Depending on the type of usage pattern configuration, in one embodiment, the network monitoring and capacity planning service 128 can utilize additional values to modify the usage patterns or make additional usage patterns. In other embodiments, the network monitoring and capacity planning service 128 can utilize the usage pattern configuration information, such as possible additional values, to repeat the determination of usage patterns or conduct an updated analysis to form updated usage patterns. The routine 900 terminates at block 910.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining, by a network monitoring service for a defined period of time, a first set of operations information, the operations information related to one or more services;
   in response to an expiration of the defined period of time, identifying, by the network monitoring service, one or more initial usage patterns based at least in part on the first set of operations information;
   transmitting, by the network monitoring service, the identified one or more initial usage patterns to a computing device;
   obtaining, by the network monitoring service from the computing device, information related to the transmitted initial usage patterns;
   updating, by the network monitoring service, at least one of the one or more initial usage patterns based at least in part on the information related to the transmitted initial usage patterns to generate updated usage patterns;

obtaining, by the network monitoring service, a second set of operations information, the second set of operations information related to the one or more services;

determining, by the network monitoring service, compliance information corresponding to the second set of operations information based at least in part on the updated usage patterns;

generating, by the network monitoring service, notification information corresponding to the determined compliance information corresponding to the second set of operations information; and transmitting, by the network monitoring service, the notification information.

2. The computer-implemented method as recited in claim 1, wherein identifying one or more initial usage patterns based at least in part on the first set of operations information includes automatically identifying the one or more initial usage patterns corresponding to identified non-random operations information.

3. The computer-implemented method as recited in claim 1 further comprising updating the updated usage patterns based at least in part on the second set of operations information.

4. The computer-implemented method as recited in claim 1, wherein obtaining information related to the transmitted initial usage patterns includes obtaining a confirmation that a usage pattern corresponds to an expected set of operations information for the defined period of time.

5. The computer-implemented method as recited in claim 1, wherein obtaining information related to the transmitted initial usage patterns includes obtaining a confirmation that a usage pattern corresponds to a lack of operations information for the defined period of time.

6. A system comprising:
one or more computing devices including a processor and a memory, the one or more computing devices configured to execute computer-readable instructions to implement a network monitoring service operable to:
  obtain for a defined period of time, a first set of operations information related to providing one or more services on behalf of an identified customer;
  identify, in response to an expiration of the defined period of time, at least one initial usage pattern based at least in part on the first set of operations information;
  obtain a second set of operations information related to providing the one or more services on behalf of the identified customer;
  determine a correlation between the second set of operations information and the at least one initial usage pattern identified based at least in part on the first set of operations information; and
generate notification information, the notification information corresponding to the correlation between the second set of operations information and the at least one initial usage pattern.

7. The system as recited in claim 6, wherein the network monitoring service identifies the at least one initial usage pattern based at least in part on non-random operations information values.

8. The system as recited in claim 6, wherein the network monitoring service identifies the at least one initial usage pattern based at least in part on a statistical analysis of the first set of operations information.

9. The system as recited in claim 6, wherein the network monitoring service updates the at least one initial usage pattern based at least in part on the second set of operations information.

10. The system as recited in claim 6, wherein to determine the correlation between the second set of operation information and the at least one initial usage pattern, the network monitoring service identifies operations information in compliance with the at least one initial usage pattern.

11. The system as recited in claim 6, wherein to determine the correlation between the second set of operation information and the at least one initial usage pattern, the network monitoring service identifies operations information deviating with the at least one initial usage pattern.

12. The system as recited in claim 6, wherein to determine the correlation between the second set of operations information and the at least one initial usage pattern, the network monitoring services identifies a lack of expected operations information based at least in part on the at least one initial usage pattern.

13. The system as recited in claim 6, wherein the network monitoring service obtains information related to the at least one initial usage pattern and updates the at least one initial usage pattern based at least in part on the information related to the at least one initial usage pattern.

14. A non-transitory computer-readable medium comprising computer-executable instructions that when executed by a computing device comprising at least one processor and a memory cause the computing device to:
  obtain, for a determined period of time, a first set of operations information related to providing one or more services on behalf of an identified customer;
  determine, in response to an expiration of the determined period of time, at least one initial usage pattern from the first set of operations information;
  obtain a second set of operations information related to providing the one or more services on behalf of the identified customer;
  characterize the second set of operations information based at least in part on the at least one initial usage pattern identified from the first set of operations information; and
  generate notification information corresponding to the characterized second set of operations information based at least in part on the at least one initial usage pattern.

15. The non-transitory computer-readable medium as recited in claim 14, wherein characterizing the second set of operations information to the at least one usage pattern includes characterizing operations information as one of compliant with the at least one initial usage pattern or deviating from the at least one initial usage pattern.

16. The non-transitory computer-readable medium as recited in claim 14, wherein the instructions further cause the computing device to
  transmit the at least one initial usage pattern to another computing device;
  obtain, from the other computing device, information related to the at least one initial usage pattern; and
  update the at least one initial usage pattern based at least in part on the information related to the transmitted initial usage pattern to generate an updated usage pattern.

17. The non-transitory computer-readable medium as recited in claim 14, wherein the operations information includes at least one of file system information, networking interface information, or computing device resource information.

18. The non-transitory computer-readable medium as recited in claim 14, wherein the at least one usage pattern is based at least in part on non-random operations information values.

19. A computer-implemented method comprising:
 obtaining, for a determined period of time, a set of operations information related to providing a service on behalf of an identified customer;
 determining, in response to an expiration of the determined period of time, an initial usage pattern corresponding to the set of operations information;
 transmitting the initial usage pattern to a computing device;
 receiving, from the computing device, usage pattern configuration information;
 updating the initial usage pattern based at least in part on the usage pattern configuration information to generate an updated usage pattern;
 obtaining, a second set of operations information, the second set of operations information to providing a service on behalf of an identified customer;
 determining compliance information corresponding to the second set of operations information based at least in part on the updated usage patterns; and
 implementing corrective measures based on the determined compliance information.

20. The computer-implemented method as recited in claim 19, wherein the usage pattern configuration information includes a confirmation that the initial usage pattern is valid.

21. The computer-implemented method as recited in claim 19 further comprising initiating display of a graphical interface on the computing device to enable a user to input the usage pattern configuration information.

22. The computer-implemented method as recited in claim 19 wherein the corrective measures comprise configuring at least one service to operate in a different configuration or mode.

* * * * *